United States Patent [19]

Okuda

[11] 4,136,533
[45] Jan. 30, 1979

[54] DRIVE APPARATUS FOR ROLLING ROLLS

[75] Inventor: Hiroji Okuda, Nara, Japan

[73] Assignee: Koyo Seiko Company Limited, Osaka, Japan

[21] Appl. No.: 820,123

[22] Filed: Jul. 28, 1977

[30] Foreign Application Priority Data

May 19, 1977 [JP] Japan .................. 52/64639[U]

[51] Int. Cl.² ............................................. F16D 3/06
[52] U.S. Cl. ...................................... 64/23; 64/23.5; 64/23.6
[58] Field of Search ................ 64/23 R, 23.5, 23.6, 64/4, 23.7

[56] References Cited

U.S. PATENT DOCUMENTS

| | | | |
|---|---|---|---|
| 1,556,840 | 10/1925 | Kadesch | 64/17 |
| 2,259,460 | 10/1941 | Dexter | 64/23.5 |
| 2,697,335 | 12/1954 | Peterson | 64/23 |
| 3,069,875 | 12/1962 | Crum | 64/23 |
| 3,108,457 | 10/1963 | Weasler | 64/23 |
| 3,228,733 | 1/1966 | Mangiavacchi | 64/23 |
| 3,400,558 | 9/1968 | Haines | 64/23 |
| 3,618,340 | 11/1971 | Geisthoff | 64/23 |
| 3,673,816 | 7/1972 | Kuszaj | 64/23 |
| 3,779,037 | 12/1973 | Petros | 64/23 |
| 3,940,948 | 3/1976 | SchultenKamper | 64/23 |
| 3,942,336 | 3/1976 | Schultenhamper | 64/23 |

FOREIGN PATENT DOCUMENTS

| | | | |
|---|---|---|---|
| 1290685 | 3/1962 | France | 64/23 |
| 636304 | 3/1948 | United Kingdom | 64/23 |
| 1201438 | 7/1970 | United Kingdom | 64/23 |

Primary Examiner—Samuel Scott
Assistant Examiner—R. C. Turner
Attorney, Agent, or Firm—Mason, Fenwick & Lawrence

[57] ABSTRACT

The coupling of a drive spindle to be fitted to a driven shaft has a fitting bore provided with liner grooves of suitable width opposed to each other diametrically of the bore and extending in parallel axially thereof. Two wedge-shaped superposed liners are fitted in each of the liner grooves in such a combination that the planar surfaces of the inner liners facing each other provide diametrically opposed parallel planar surfaces defining the fitting bore. The inner liners are movable in parallel radially of the fitting bore by axially moving the outer liners to bring the opposed planar surfaces of the inner liners into intimate fitting contact with parallel planar surfaces formed on the peripheral surface of the driven shaft and opposed to each other diametrically of the shaft. The liners in this state are locked to the coupling, rendering the drive apparatus operable free of oscillation.

6 Claims, 5 Drawing Figures

DRIVE APPARATUS FOR ROLLING ROLLS

BACKGROUND OF THE INVENTION

This invention relates to a drive apparatus for rolling rolls, and more particularly to a novel structure for detachably fitting the coupling of a drive spindle to a driven shaft.

Drive spindles for driving rolling rolls of rolling mills are adapted to detachably connect a drive shaft to a driven shaft, namely to the neck of the rolling roll. They include two universal joints for maintaining the drive shaft and the driven shaft in alignment with each other as well as for the transmission of torque and a coupling to be detachably fitted to the driven shaft.

With drive spindles of this type heretofore known, the coupling is loosely fitted to the neck of the rolling roll serving as a driven shaft so as to be easily detachable therefrom. This gives rise to vibration or oscillation during rotation, causing marked wear of the fitting portions during the operation of the rolling mill and consequently producing a greater clearance between the fitting portions and greater oscillation and noise. The rolling operation therefore involves seriously reduced accuracy. Furthermore, the bearings supporting the rolling rolls and backup rolls will then be subjected to repeated oscillation and impact and thereby damaged within a relatively short period of time. The worn fitting portions are usually repaired for example by being padded with a material of increased hardness, but this requires a troublesome multi-step procedure.

SUMMARY OF THE INVENTION

An object of this invention is to completely eliminate the vibration or oscillation involved in the rotation of a drive apparatus to prevent the wear of the fitting portions thereof.

Another object of this invention is to make it possible to adjust as desired the clearance between the coupling of a drive spindle and a driven shaft, namely the neck of a rolling roll, fitted in the coupling so that the fitting portions, even when worn away, can be fitted together easily be readjustment.

According to this invention, the fitting bore of the coupling for receiving the roll neck therein is provided with liner grooves of suitable width opposed to each other diametrically of the bore and extending in parallel to each other axially thereof, and two superposed wedge-shaped liners are placed in each of the grooves.

The two liners in each groove are in such a combination that the inner liners facing each other provide parallel planar surfaces defining the fitting bore and are movable in parallel radially of the bore by axially moving the outer liners in contact with the bottom of the grooves.

The opposed planar surfaces of the inner liners are therefore intimately fittable to parallel planar surfaces formed on the periphery of a driven shaft and opposed diametrically of the shaft. When thus adjusted to the fitting position, the liners are securely held within the liner grooves of the coupling.

Since the two pairs of liners are held in the grooves respectively with the opposed planar surfaces of the inner liners in intimate contact with the planar surfaces of the driven shaft, the driven shaft can be fitted in the coupling with no clearance present between the parallel planar surfaces, rendering the drive apparatus rotatable free of any oscillation.

The drive apparatus thus rotatable free of any oscillation favors the rotation of the rolling roll, assuring a stabilized accurate rolling operation over a prolonged period of time.

The elimination of oscillation further serves to prevent noise and wear on the fitting portions, greatly extending the life of roll bearings and other parts of the rolling mill.

Because the outer liners are axially slidable for adjustment, the clearance between the fitting portions is adjustable promptly and easily as desired.

Other objects and features of this invention will become more apparent from the following description.

DESCRIPTION OF THE PREFERRED EMBODIMENT

Figure 1:
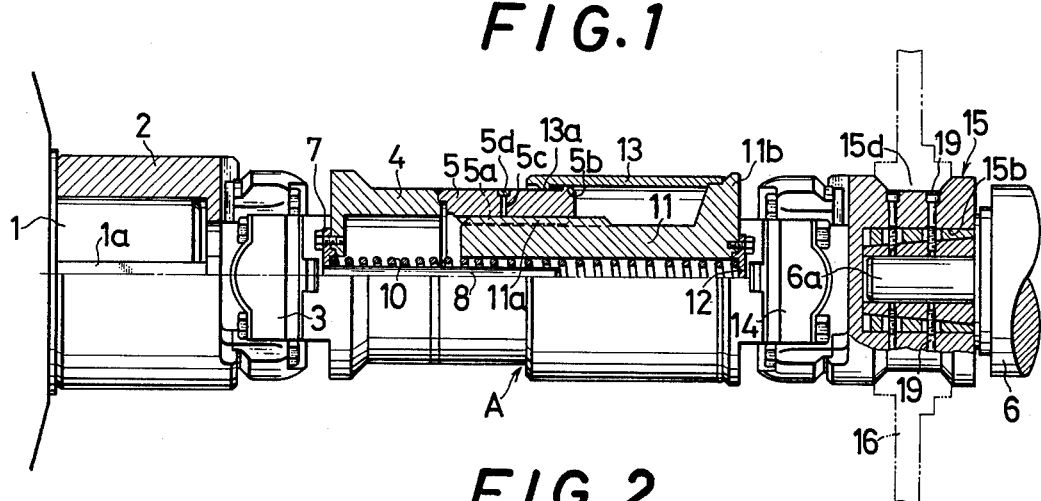
FIG. 1 is a view partly in longitudinal section showing an embodiment of this invention.

With reference to the drawings, a drive apparatus embodying this invention for rolling mills will be described below. FIG. 1 shows a drive shaft 1 connected to and rotatable by a motor or like drive means and a drive spindle A including a fitting yoke 2 at its one end. The fitting yoke 2 is fitted and secured to the drive shaft 1 as by a shrinkage fit and rendered rotatable therewith as by a key 1a. The fitting yoke 2 is connected by a universal joint assembly 3 to a drive spindle member 4 included in the telescopic spindle assembly of the drive spindle A. A hollow cylindrical auxiliary spindle member 5 extending toward a rolling roll 6 is aligned with the drive spindle member 4 and joined to one end of the spindle member 4 as by welding. The auxiliary spindle member 5 is internally splined as at 5a over a specified distance axially thereof. The auxiliary spindle member 5 is provided with a projection 5b on its outer peripheral surface at one end thereof toward the rolling roll 6.

The auxiliary spindle member 5 has an oil port 5c extending through its wall for applying oil to the splined portion 5a therethrough. The oil port 5c is usually closed with a plug 5d screwed in the port 5c. The drive spindle member 5 is provided with a spring seat 7 closing the open end thereof connected to the universal joint 3. The spring seat 7 is fixedly provided with a guide bar 8 positioned on the axis of the drive spindle member 4 and extending axially thereof. An elongated coiled spring 10 exerting a biasing force in its longitudinal direction is guided by the bar 8. A tubular driven spindle member 11 is slidable within the drive spindle member 4 and auxiliary spindle member 5 and has an inner peripheral surface for guiding the coiled spring 10. The telescopic spindle assembly of the drive spindle A is composed of the spindle members 4 and 11. The driven spindle member 11 has an external splined portion 11a slidably fitting in the splined portion 5a. By virtue of the spline engagement, torque can be delivered from the drive spindle member 4 to the driven spindle member 11, while the spindle members 4 and 11 are axially slidable relative to each other. A spring seat 12 is secured to and closes the open end of the driven shaft member 11 connected to the end of the rolling roll 6. The coiled spring 10 is provided between and bears against the spring seats 7 and 12, biasing the drive spindle member 4 and driven spindle member 11 away from each other to extend the spindle assembly. The coiled spring 10 may be replaced by hydraulic means for biasing the spindle members 4 and 11 as above. A tubular cover 13 slidably fitting around the auxiliary spindle member 5 has one end secured to the flange 11b of the driven spindle member 11 and the other end having a projection 13a on its inner periphery. The cover 13 covers the outer periphery of the driven spindle member 11. The projection 13a is in engagement with the projection 5b on the auxiliary spindle member 5, preventing the spindle member 11 from moving further away from the auxiliary spindle member 5 and thus preventing further extension of the spindle assembly.

Figure 2:
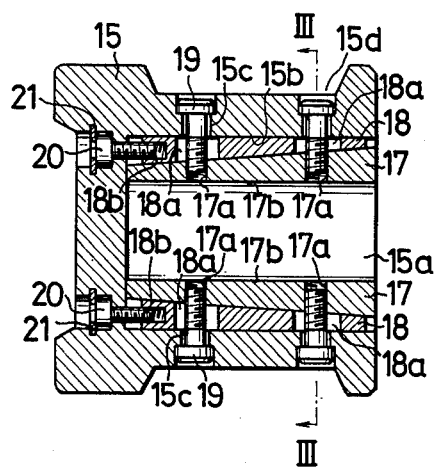
FIG. 2 is a view in longitudinal section showing the coupling of a drive spindle to be connected to a driven shaft.
Figure 3:
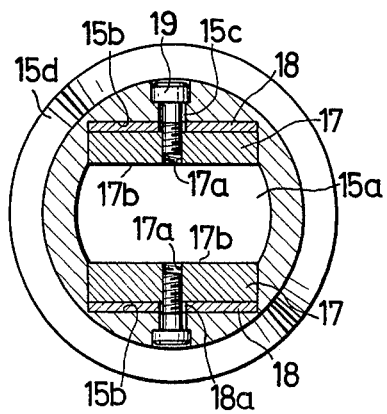
FIG. 3 is a view in cross section taken along the line III—III in FIG. 2.

A universal joint assembly 14 connects the driven spindle assembly 11 to a coupling 15 providing the other end of the drive spindle A to be connected to a driven shaft, i.e. to the end of the roll 6. The coupling 15 is formed in its outer surface with a peripheral groove 15d in which holders 16 engage to grip the coupling 15 and connect the coupling 15 to or disconnect the same from the driven shaft. As seen in FIGS. 2 and 3, the coupling 15 has a fitting bore 15a for receiving the driven shaft, i.e. the neck 6a of the roll 6. The fitting bore 15a is provided with flat liner grooves 15b of suitable width extending in parallel to each other axially of the bore 15a and opposed to each other diametrically of the coupling. Each of the flat liner grooves 15b slidably receives therein a pair of superposed inner liner 17 and outer liner 18 having a width substantially equal to that of the groove 15b. The inner and outer liners 17, 18 are wedge-shaped and have flat slanting surfaces to be held in contact with each other. The liners are so combined that when the outer liners 18 are moved axially of the fitting bore 15a, the opposed inside surfaces 17b of the inner liners 17, while kept in parallel to each other, are moved in parallel radially of the bore 15a, varying the distance between the opposed surfaces 17b. To permit the axial movement of the outer liners 18, the outer liners 18 have a smaller axial length than the fitting bore 15a or the inner liners 17. Each of the inner liners 17 has threaded holes 17a spaced apart by a specified distance. Each of the outer liners 18 has slots 18a substantially concentric with the holes 17a in the inner liner 17, having a larger width than the holes 17a and elongated axially of the bore 15a. In corresponding relation to the threaded holes 17a, the coupling 15 has bolt holes 15c extending radially through its wall. The bolt hole 15c includes an enlarged hole for receiving the head of a bolt and a smaller hole in communication therewith. Each of locking bolts 19 has a hexagonal socket in its head. The locking bolts 19 are passed through the holes 15c and the slots 18a in the outer liner 18 and screwed into the threaded holes 17a in the inner liner 17 to fasten the inner and outer liners 17, 18 to the coupling 15 by the locking bolts 19. With the locking bolts 19 passing through the slots 18a, the outer liner 18 is axially movable within the range of the length of the slots 18a.

Figure 4:
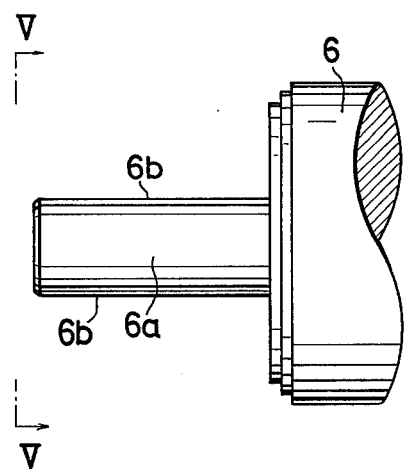
FIG. 4 is a view showing the neck of a rolling roll serving as the driven shaft.
Figure 5:
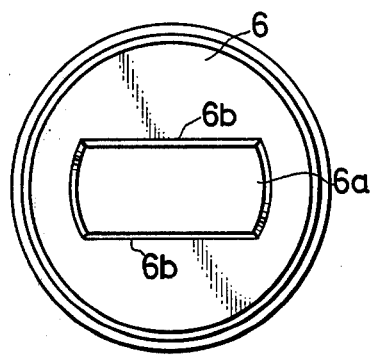
FIG. 5 is a side elevation of the roll neck as it is seen in the direction of the line V—V in FIG. 4.

The neck portion 6a of the rolling roll 6 is fitted in the bore 15a of the coupling 15. As seen in FIGS. 4 and 5, the roll neck 6a extends from the end of the rolling roll 6 coaxially therewith and is formed on its periphery with parallel planar surfaces 6b opposed to each other diametrically of the neck to provide an approximately oval rectangular cross section. The contour of the roll neck 6a conforms to the shape of the fitting bore 15a of the coupling 15 with the liners fitting in the grooves 15b, and the roll neck 6a is loosely fittable in the bore 15a. The roll neck can be fitted in the coupling 15 with intimate contact between the opposed surfaces 17b and 6b by the adjustment of the outer liners 18 and tighting up the locking bolts 19.

To assemble the drive apparatus of this invention by fitting the roll neck 6a into the bore 15a, the locking bolts 19 are first loosened and then the neck 6a is fitted into the bore 15a. Screw members 20 are screwed into threaded holes 18b in the ends of the outer liners 18, axially sliding the outer liners 18 to vary the distance between the opposed parallel surfaces 17b of the inner liners 17 and to bring the surfaces 17b into intimate contact with the opposed planar portions 6b of the neck 6a. The locking bolts 19 are thereafter tightened up to hold the neck in intimate contact with the coupling. Indicated at 21 are snap rings attached to the coupling 15 to prevent the axial movement of the screw members 20. After the adjustment has been completed, the screw members 20 can be removed.

The drive shaft 1, when driven by drive means, rotates the drive spindle A comprising the fitting yoke 2, universal joint assembly 3, drive spindle member 4, driven spindle member 11, universal joint assembly 14 and coupling 15, whereby the torque is delivered to the neck 6a of the rolling roll 6 fitting in the coupling 15 to rotate the roll 6 free of oscillation or noise, since the inside surfaces 17b of the inner liners 17 are in intimate contact with the planar surfaces 6b of the neck 6a and the liners 17, 18 are secured to the coupling 15. Further because the coupling 15 is biased toward the roll 6 at all times by the coiled spring 10 through the universal joint assembly 14, the coupling 15 is held in fitting contact with the neck 6a at all times free of any axial backlash. To prevent the wear of the liners 17 and 18 with improved effectiveness, the liners may preferably be coated with metal by spray coating.

When some clearance is created between the fitting surfaces 17b and 6b of the coupling 15 and neck 6a, giving rise to backlash, the rolling roll is released from the coupling 15 in the same manner as in the replacement of the roll to be described below. The locking bolts 19 are loosened, the outer liners 18 are axially moved to adjust the face-to-face distance between the inner liners 17, and the liners 17 are brought into intimate contact with the neck as in the original state in the same manner as already described.

To replace the old rolling roll 6 with a new one, the locking bolts 19 on the coupling 15 are loosened, the holders 16 are engaged in the peripheral groove 15d to grip the coupling 15 and then forced axially away from the roll 6 against the coiled spring 10, whereby the coupling 15 is separated from the roll neck 6a. A new roll is installed in position in place of the old roll 6, the coupling 15 is returned to place, and the outer liners 18 are moved for adjustment to fit the coupling 15 intimately over the neck of the new roll, whereby replacement can be completed.

As already stated, the coupling 15 of the drive spindle A is axially biased toward the roll neck 6a by the coiled spring 10 or hydraulic means, so that the drive spindle is operable free of any axial backlash. The superposed wedge-shaped liners 17 and 18 which hold the coupling in intimate contact with the roll neck 6a prevent occurrence of clearance therebetween, affording intimate contact over an increased planar area for the transmission of torque and eliminating the oscillation, noise and wear of the parts to be otherwise produced by the rotation of the apparatus. The present apparatus therefore assures a stabilized accurate rolling operation over a prolonged period of time. The structure disclosed improves the life of the apparatus itself as well as the life of the bearings for the rolling rolls and backup rolls.

What is claimed is:

1. A drive assembly for a rolling roll comprising:

a driven shaft extending from one end of a rolling roll axially thereof and formed on its peripheral surface with two parallel diametrically opposed planar surface portions on opposite sides of the shaft, the planar surface portions being positioned adjacent one end of the driven shaft, an intermediate shaft, a driven fitting yoke connected to one end of said intermediate shaft by a universal joint assembly, a coupling connected to the other end of the intermediate shaft by another universal joint assembly and fittable to the driven shaft, the coupling having a fitting bore for releasably receiving therein the driven shaft with a loose fit, the fitting bore being provided with two flat-bottomed liner grooves of suitable width diametrically opposed to each other on opposite sides of the fitting bore and extending in an axial direction thereof in parallel to each other in corresponding facing relation to the parallel planar surface portions of the driven shaft, inner and outer wedge-shaped liners positioned in each of said liner grooves, said inner and outer liners having facing flat slanting surfaces slanted with respect to the axis of the coupling in contact with each other, the outer liners having an outer surface positioned on the flat bottom of their respective liner groove in a manner permitting movement of the outer liner in an axial direction in its respective liner groove in the coupling, the inner liners being positioned in their respective liner grooves in superimposed relation to and inwardly of the outer liners and having an inwardly facing planar surface engagable with one of the planar surfaces of the driven shaft and oriented parallel to the outer surfaces of the outer liners, holding means comprising a plurality of locking bolts radially mounted on the coupling and screwed into threaded holes in the inner liners for securely holding each combination of the outer liner and inner liner in each of the liner grooves, each outer liner having axially elongated slots for passing the bolts therethrough so as to permit movement of the outer liners in an axial direction in their respective liner groove in the coupling; and positioning means mounted in the coupling for axially moving the outer liners to consequently effect movement of the inner liners radially of the fitting bore to vary the distance between the inwardly facing surface of the inner liners and the outwardly facing surfaces of the respective outer liners.

2. A drive assembly as defined in claim 1 wherein the driven shaft is a roll neck formed on the rolling roll.

3. A drive assembly as recited in claim 1 wherein said positioning means comprises a screw member mounted for rotation on the coupling and threadably engaged in a threaded opening in one end of each outer liner and restraining means on the coupling for preventing axial movement of each screw member.

4. The invention of claim 3 wherein the driven shaft is a roll neck formed on the rolling roll.

5. A drive assembly as recited in claim 1 wherein said flat liner grooves are of rectangular cross-sectional configuration.

6. The invention of claim 5 wherein said positioning means comprises a screw member mounted for rotation on the coupling and threadably engaged in a threaded opening in one end of each outer liner and restraining means on the coupling for preventing axial movement of each screw member.

* * * * *